July 12, 1966  R. D. HULL ETAL  3,260,106
WEB TENSION METER
Filed Feb. 18, 1964  3 Sheets-Sheet 1
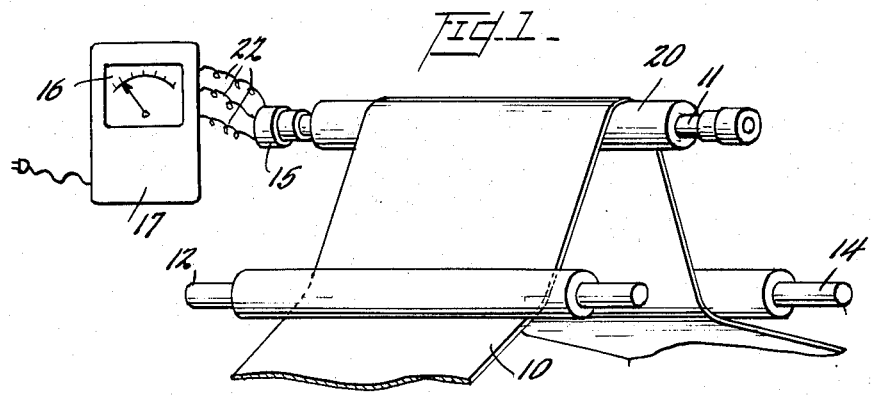
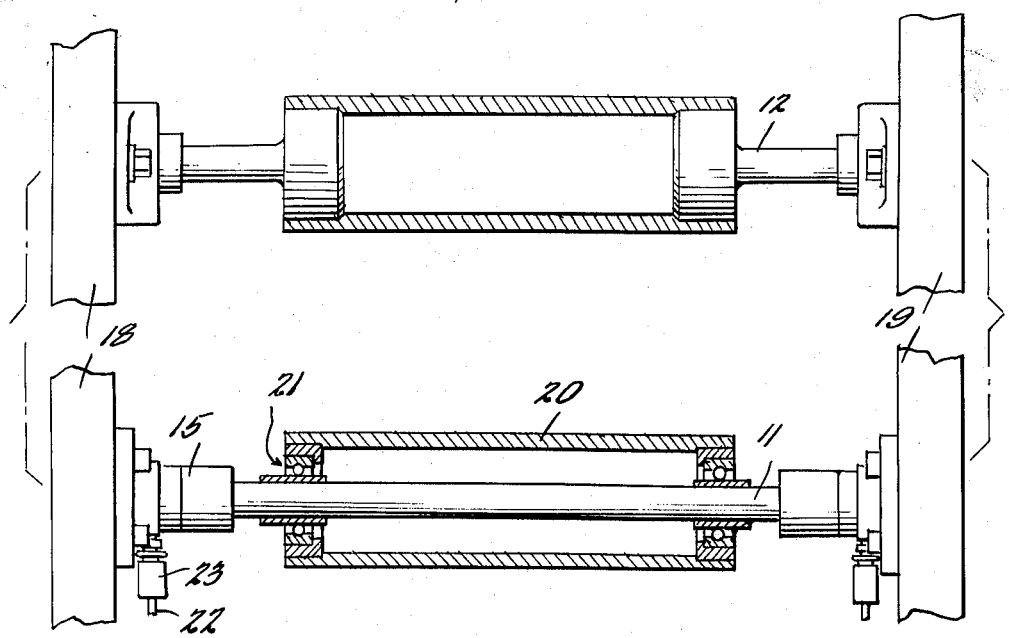
INVENTORS
Richard D. Hull
Donald G. Hanefeld
BY Karl Bye,
Watson, Cole, Grindle & Watson ATTORNEYS

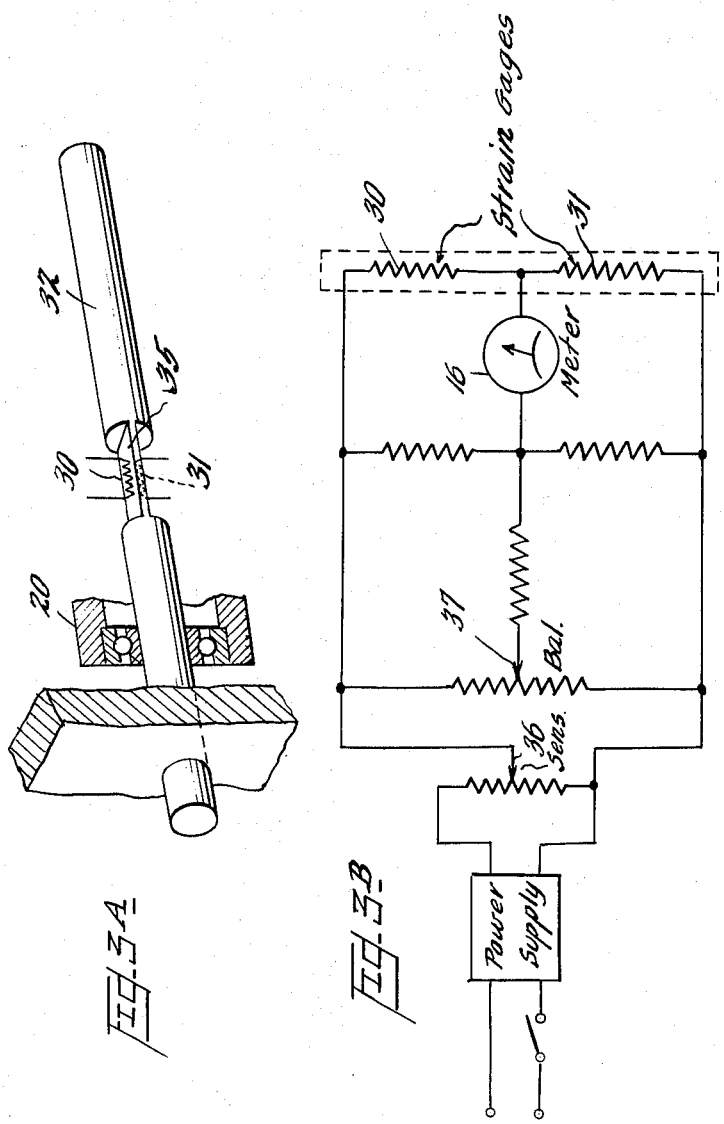

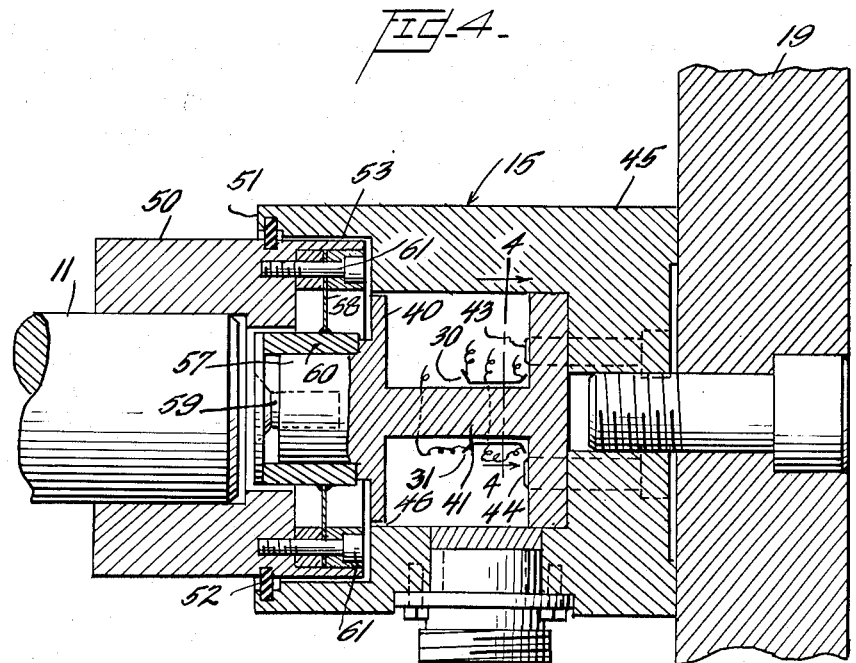
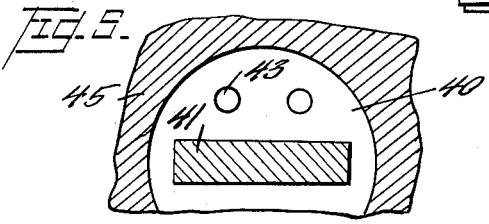
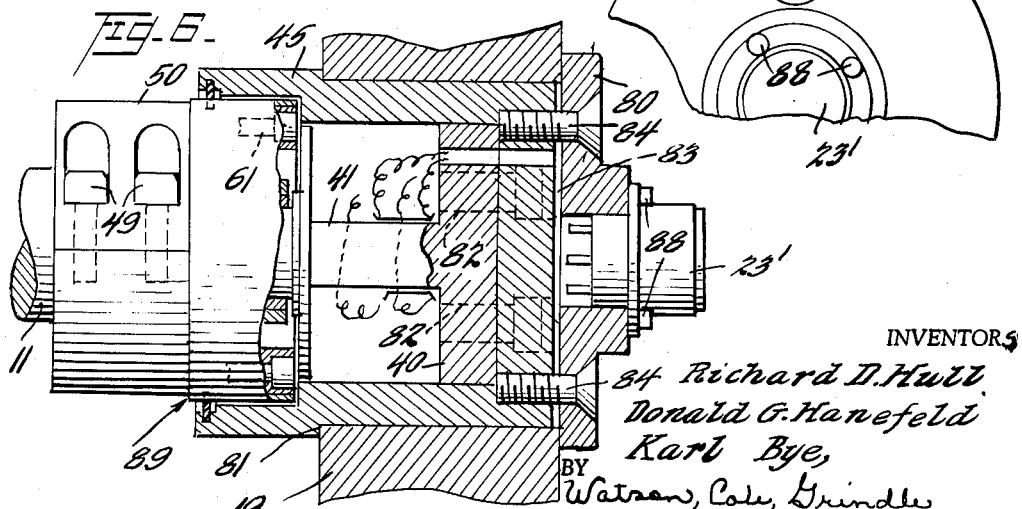
INVENTORS
Richard D. Hull
Donald G. Hanefeld
Karl Bye,
BY Watson, Cole, Grindle
& Watson
ATTORNEYS

United States Patent Office 3,260,106
Patented July 12, 1966

3,260,106
WEB TENSION METER
Richard D. Hull, Durham, Donald G. Hanefeld, Somersworth, and Karl Bye, Dover, N.H., assignors, by mesne assignments, to Moore Business Forms, Inc., Niagara Falls, N.Y., a corporation of Delaware
Filed Feb. 18, 1964, Ser. No. 345,747
5 Claims. (Cl. 73—144)

This invention relates to means for measuring and indicating the tension of a continuously movable web.

In industrial processing equipment, it is often necessary to measure and control the tension in a web moving at high speeds. For example, in printing presses the ability to recognize the current tension in the continuously moving paper web permits optimization of press efficiency. Equipment for measuring tension in movable webs is well known as well as corresponding automatic control equipment which may be operated responsive to web tension measurement where desirable. Alternatively, a visual indicator in many applications is sufficient to permit manual intervention and control of the web tension. In accordance with the present invention improvements are afforded in the measurement techniques which are applicable to either manual or automatic controls.

Control of measurement accuracy has been difficult in the prior art devices because undesirable variable input components are sensed such as friction, torque, speed, temperature response, wear and hysteresis properties, which prevent accurate measurements over long time periods and variable conditions even if equipment is carefully calibrated when initially installed.

Calibration and installation techniques are in themselves quite complex in many instances requiring extensive engineering analysis and computations. Thus, it has not been possible to produce a truly universal measuring arrangement capable of installation in existing equipment without modification when using prior art techniques. For example, measuring apparatus of the prior art does not lend itself to mere replacement of an existing roller in standard equipment because of size limitations, preferred load angles and difficult engineering calculations of bending moment, etc.

Thus, it is a general object of the invention to provide improved measuring equipment for indicating tension of a moving web.

A more specific object of the invention is to produce more accurate measurements of web tension in apparatus which may be universally employed in existing standard industrial equipment.

Another object of the invention is to produce measurements of web tension independent of torque, friction, speed, and hysteresis errors.

A further object of the invention is to provide web tension measurement apparatus which may be installed and calibrated with simplified engineering consideration of geometry and load requirements.

A still further object of the invention is to provide web tension measurement apparatus which will hold initial calibration over long periods of time without being affected by variable operational conditions or environment.

Thus, in accordance with this invention, the tension of a continuously moving web is measured by sensing the normal force component of a shaft and guide roll over which the web is rolled with transducing means located along the axis of the shaft. This eliminates considerations of torque and simplifies engineering considerations in installation which requires only a knowledge of the approximate loading and the load angle without dependence upon the length of lever arms or other installation parameters.

The shaft and guide roll over which the web is rolled is mounted to frame members in a fixed position without the use of sliding and or ball joints, etc. thus to eliminate any errors introduced by friction of wear. Both torque and friction components make measurements change with speed on prior art devices, but measurements made in the improved manner of this invention are not significantly influenced by speed components. All friction components are confined to a guide roll rotatable on bearings about the fixed shaft, and thus contribute no torque or wear component to the measurement taken along the axis of the shaft.

Variations of loading direction with respect to the mounting of the fixed shaft are essentially eliminated from installment considerations by providing a relative rotation about the axis of the shaft for the displacement sensing transducers. Thus, the calculations are simply determined from shaft strain as referenced for example to strain measurements in cantilever mounts at each end of the shaft. Resistive strain gages are employed with a Wheatstone bridge circuit for visual indication in a calibratable meter. Thus, convenient indication signals are available either for monitor or control purposes.

To avoid frictional or strain errors introduced by ordinary or prior art mounting means, such as self aligning bearings, and to achieve reasonably universal mounting without extremely precise dimensional alignment, the fixed shaft is coupled by a diaphragm to fixed frame members. This diaphragm, which may be a thin steel member, for example, is stiff in the direction of shaft loading due to the web tension, but permits end flexing or minor degrees of shaft misalignment, without compromising the displacement stiffness and without introducing hysteresis which results from any form of mounting in which sliding or rotating members are employed. Also, errors due to temperature changes affecting shaft length are eliminated, and since the shaft does not rotate the diaphragm permits quite liberal shaft alignment tolerances in installation without affecting accuracy. Also, with location of sensing transducers at the ends of the shaft, any errors otherwise introduced by bending of the shaft are essentially eliminated.

For a more detailed description of the measuring apparatus afforded by this invention with attendant features and objects, reference is made to the accompanying drawing, wherein:

FIGURE 1 is a perspective view of a web tension meter installation along the path of a moving web, FIGURE 2 is a plan view partially in section of a tension measuring shaft mounted in accordance with the teachings of the invention, FIGURES 3A and 3B are schematic representations of force measuring equipment and meter circuits constructed in accordance with the invention, FIGURE 4 is a side view, partly in section of a transducer mount embodiment of the invention, FIGURE 5 is an end view, taken along lines 4—4 of FIGURE 4, showing the cross section of force sensing structure employed in this embodiment.

FIGURE 6 is a side view partially in section of a variable load angle mount afforded by a further embodiment of the invention, and FIGURE 7 is a partial end view, looking to the left of FIGURE 6, of an adjustable mounting cap employed in this embodiment of the invention.

A typical web tension measuring mount is illustrated in FIGURE 1. A continuously moving web 10 is thus rolled over a measuring shaft 11 and roller 20 displaced from a pair of rollers 12 and 14. This installation produces a web tension load component which tends to displace measuring shaft 11 downwardly somewhere between the two rollers 12 and 14, the force depending upon the angle subtended by the web as it passes over the measuring shaft 11 and roller 20.

Along the axis of the measuring shaft 11 is mounted at least one force sensor, which may be embodied in cap 15 at one or both ends of the shaft. The force may be sensed by a resistive strain gage and monitored by appropriate electronic processing circuits to display the tension reading on the face 16 of the meter 17.

As may be seen from FIGURE 2, the measuring shaft 11 is mounted in a fixed position between frame members 18, 19, and is provided with a guide roll 20 with suitable bearings 21 so that the metering shaft 11 need not rotate as the web passes over the guide roll 20. In this typical installation, the wires 22 pass from the plug 23 at end cap 15 to the appropriate meter arrangement. Although it is seen that the construction permits the substitution of a measuring shaft 11 and guide roll 20 with bearings for a conventional roller 12 in an end cap mounting arrangement between frame members 18, 19, it is recognizable that other mounting arrangements may be employed. It is significant, however, that the approach afforded by the present invention permits an installation in extremely cramped quarters and can replace a standard roller without requiring special mounting brackets and extra mounting space.

As seen from FIGURE 3A, a simplified mounting technique is attainable by placing resistive strain gages 30, 31 along the axis of a fixed guide roll shaft 32. It is also significant that this produces measurements of improved accuracy by reducing temperature, torque and frictional errors to a negligible magnitude. For example, temperature differentials between resistive strain gages 30 and 31 are not apt to occur. With the fixed shaft and rotatable guide roll mount 20 (FIGURE 2), frictional or wear components introduced into the guide roll are not represented as part of the shaft force measurement. Furthermore, the shaft 32 may be rotated within its fixed mount at the time of installation to present the plane of the force member 35 in the proper direction for maximum sensitivity or maximum load capacity to any loading angle presented by the moving web and associated guide rolls. In calculating the parameters of installation, forces on the shaft 32 need be considered without complications afforded in use of the length of lever arm outside the axis of the shaft or the direction of load angle relative to the position of the deflection detectors.

A conventional Wheatstone bridge circuit shown in FIGURE 3B incorporates the resistive strain gages 30, 31, to produce a deflection on meter 16 as a function of the force. The meter may be calibrated to read tension directly in various ranges set by the sensitivity control 36. Initially the balance adjustment 37 permits balancing the bridge by adding resistance to one side to compensate for roller and shaft weight, or minor differences in strain gages 30, 31. Thus a simple yet versatile indication is provided, which may either be used for visual indication, or which may be coupled alternatively to a servo system for automatic control of tension, if desired.

Preferably, the transducers are located in caps 15 placed at both ends of the metering shaft 11 as shown in FIGURES 1 and 2 to permit measurement of shaft force without a deflection (bending) component. A typical cap configuration for use at both ends is that of FIGURES 4 and 5. In this case, the four strain gages employed would be connected in the bridge of FIGURE 3B, replacing the two resistive arms 38, 39.

Basically, the strain member 40 is extended along the axis of the shaft 11 and is provided with a rectangular strain area 41 having a cross section of standard calibrated dimension determined by the desired load capacity of the device. Strain gages 30, 31 are mounted on opposite sides of the strain area 41 to indicate strain (deflection vertically as shown) about the cantilever mount provided by stud bolts 43, 44.

A cylindrical base member 45 is bolted to frame member 19 and surrounds the strain member. An internal diameter provided on base member 45 permits enough clearance in gap 46 to permit a desirable range of deflection of the cantilever mounted member 40, typically .003 to .006 inch.

Th shaft itself is clamped (49 FIGURE 6) by a cylindrical cap member 50 which may be extended as in FIGURE 4 within flange 51 of the base member 45, and closed by a rubber or plastic dust seal 52. Alternately, as shown in FIGURE 6, the clamp member 50 may be removable from extension 89 within member 45. A clearance gap 53 is provided by the internal diameter of flange 51 to permit shaft angular displacement within the appropriate range of the strain area 41. This construction serves as a mechanical stop to prevent excessive angular displacement, and the gap may be typically .015 inch.

A round tapered shaft extension 57 on strain member 40 is fitted by a thin steel diaphragm 58 held onto the shaft extension 57 by stud bolt 59. The inner periphery at diaphragm 58 is held upon the shaft extension 57 mount ring 60, to which the diaphragm 58 is sweated or welded. The outer periphery of the diaphragm 58 is clamped to the cap member 50 (89) by stud bolts 61 mounted about the cap in various positions.

It may be seen that any change in length of shaft 11 resulting from temperature expansion or frame distortion will be taken up by flexing of diaphragm 58 without introducing a measurable (vertical) displacement of the deflection area 41. Similarly, slight axial misalignment that may be encountered in installation will be compensated by flexure of diaphragm 58. However, the diaphragm 58 is a thin steel plate, for example, very stiff in the vertical or normal to the axis plane so that any displacement of the shaft 11 by tension in the web will result in a strain of cantilever mounted strain area 41 and a coeresponding strain reading will be produced in gages 30, 31. Thus the diaphragm mounting technique not only permits cruder mounting techniques for the measuring shaft assembly, but produces greater accuracy of measurement, by using a flexural member rather than a sliding or rotating member which would introduce friction and therefore hysteresis.

When the load angle changes, the magnitude of deflection introduced in deflection area 41 is changed. Thus if the load is in a vertical direction in the plane of the drawing normal to the shaft axis, maximum sensitivity is produced. A limiting position of zero sensitivity is produced when the load angle would be normal to the drawing, with the simple rectangular cross section 41 and two strain gages in use. Although sensitivity itself may be adjusted in the bridge circuit, the degree of error is smaller when the deflecting member itself has its maximum sensitivity deflection. Thus, the present design permits an additional and desirable mechanical method of changing sensitivity by simple rotation of the transducer about the axis of shaft 11.

This modified mounting arrangement shown in FIGURES 6 and 7 has a rotatable cap member 80, which permits alignment of the deflection area 41 with the exact load angle encountered in different installations. The base member 45 in this case has shoulders 81 which permit installation through an aperture in frame member 19 to receive the rotatable cap member 80. This cap member 80 is affixed to the base member 45 by stud bolts 84, which rotates therewith to the selected angular position. By foreshortening the base member 45 to extend only partly through frame member 19, gap 83 is produced, making the assembly freely rotatable in a circular mount aperture, unless the cap is tightened by stud bolts 84 to engage frictionally the frame member 19 and clamp the entire measurement shaft assembly in position. In this mount, the connector 23 is affixed axially to the cap member 80 by stud bolt 88.

While advantages of size and simple cantilever mounting and calculation of deflection members within controlled limits results from axial mounting of the measuring structure along the fixed shaft exit, this becomes more important in eliminating unwanted torque and frictional effects. Even when the shaft is fixed, and does not rotate within the end cap mount if the strain member is not symmetrical about and parallel to the axis of shaft 11, the movement of the web about the shaft will introduce a twisting or torque component resulting from friction within the bearings, which varies with speed of the web.

It may thereby be recognized that this invention provides web tension measuring equipment of novel structure and of functional advantage producing more accurate measurements, than heretofore feasible. Thereby those novel features representing the nature of the invention are claimed, as follows:

1. Apparatus for measuring the tension in a continuously moving web comprising in combination, two spaced frame members, a shaft extending between the frame members and having web engaging means rotatably mounted thereon, coupling members connecting opposite ends of the shaft to the frame members, said shaft and coupling members defining at least one area of reduced cross section along the axis of the shaft, means for holding the web in engagement with the rotatably mounted means for producing a web tension load component on the shaft with web tension load components deflecting the shaft and straining the area of reduced cross section, and strain sensing transducing means located at said area of reduced section for conveying therefrom a signal derived from said straining and therefore representative of the tension in the web.

2. Apparatus as defined in claim 1 wherein the area of reduced cross section is in one said coupling members at one end of said shaft, said one coupling member comprising a dust tight enclosure surrounding said area and affixed to the corresponding frame member.

3. Apparatus as defined in claim 2, wherein the shaft is a cylindrical rod, said one coupling member further comprising a flexible diaphragm ring normal to the axis of said shaft and connected to said shaft at its outer extremity.

4. Apparatus as defined in claim 1 wherein the area of reduced cross section is extended from the end of said shaft within the corresponding coupling member, and said corresponding coupling member has a member surrounding and slightly spaced from said shaft to thereby restrict the deflection of the area of reduced cross section within defined maximum limits.

5. Apparatus as defined in claim 1 wherein the area of reduced cross section is affixed upon the end of said shaft by a rotatable coupling to extend into the corresponding coupling member, and including a rotatable mounting means affixing said corresponding coupling member to the corresponding frame member in variable angular position about the shaft axis to orient the area of reduced cross section in a preferred direction of deflection and thereby to afford selectable strain sensitivity for any loading tension angle presented by said moving web upon said shaft.

References Cited by the Examiner

UNITED STATES PATENTS

| | | | |
|---|---|---|---|
| 2,661,623 | 12/1953 | Brink | 73—144 |
| 2,911,823 | 11/1959 | Nistico et al. | 73—144 |

FOREIGN PATENTS

| | | |
|---|---|---|
| 118,335 | 1959 | Russia. |
| 139,110 | 1960 | Russia. |

RICHARD C. QUEISSER, *Primary Examiner.*

CHARLES A. RUEHL, *Assistant Examiner.*